United States Patent
Jung et al.

(10) Patent No.: US 9,054,904 B2
(45) Date of Patent: Jun. 9, 2015

(54) RECEIVING APPARATUS AND METHOD FOR RFID READER

(71) Applicant: Electronics and Telecommunications Research Institute, Daejeon (KR)

(72) Inventors: Jae-young Jung, Daejeon (KR); Sang Hyun Mo, Daejeon (KR); Won Kyu Choi, Daejeon (KR); Hoe-Sung Yang, Daejeon (KR); Chan-Won Park, Daejeon (KR); Cheol Sig Pyo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/310,930

(22) Filed: Jun. 20, 2014

(65) Prior Publication Data

US 2015/0131763 A1    May 14, 2015

(30) Foreign Application Priority Data

Nov. 12, 2013  (KR) .................... 10-2013-0137103

(51) Int. Cl.
| | |
|---|---|
| H04L 27/06 | (2006.01) |
| H04L 25/02 | (2006.01) |
| H04B 7/08 | (2006.01) |
| H04L 1/06 | (2006.01) |
| G06K 7/10 | (2006.01) |

(52) U.S. Cl.
CPC .......... *H04L 25/0204* (2013.01); *H04B 7/0885* (2013.01); *H04L 25/0228* (2013.01); *H04L 1/06* (2013.01); *G06K 7/10366* (2013.01)

(58) Field of Classification Search
CPC ... H04L 25/0204; H04L 1/06; H04L 25/0228; G06K 7/10366; H04B 7/0885
USPC .......... 375/343, 349, 142, 150, 341, 346, 347
See application file for complete search history.

(56) References Cited

U.S. PATENT DOCUMENTS 7,609,771 B2 * 10/2009 Lo .................. 375/259
7,746,942 B2    6/2010 Lee et al.
(Continued)

FOREIGN PATENT DOCUMENTS

| JP | WO2012/153659 | * 11/2012 | .............. H04J 11/00 |
|---|---|---|---|
| KR | 10-2007-0078332 A | 7/2007 | |
| KR | 10-2008-0040813 A | 5/2008 | |

(Continued)

OTHER PUBLICATIONS

Christoph Angerer, Robert Langweiser, Georg Maier and Markus Rupp, "Maximal Ratio Combining Receivers for Dual Antenna RFID Readers" 2009, IEEE the internation microwave workshop on wireless sensing , local positioning and RFID.*

*Primary Examiner* — Dhaval Patel

(57) ABSTRACT

A receiving apparatus for an RFID reader estimates channel coefficients for each of a plurality of receiving antennas based on tag response signals received via a plurality of receiving antennas, compensates the tag response signals received via the plurality of receiving antennas based on the channel coefficients estimated for each of a plurality of channel estimators, combines the compensated tag response signals for each of the plurality of receiving antennas to generate a combined signal, and detect bits in the combined signal.

16 Claims, 8 Drawing Sheets

(56) References Cited

U.S. PATENT DOCUMENTS 8,350,665 B1 * 1/2013 Sundstrom et al. ............ 340/3.2
8,451,097 B2 * 5/2013 Drucker ....................... 340/10.4
8,605,843 B2 * 12/2013 Dupont et al. ................ 375/347

2013/0106580 A1  5/2013 Bae et al.

FOREIGN PATENT DOCUMENTS

KR    10-2009-0116853 A    11/2009

* cited by examiner

RECEIVING APPARATUS AND METHOD FOR RFID READER

CROSS-REFERENCE TO RELATED APPLICATION

This application claims priority to and the benefit of Korean Patent Application No. 10-2013-0137103 filed in the Korean Intellectual Property Office on Nov. 12, 2013, the entire contents of which are incorporated herein by reference.

BACKGROUND OF THE INVENTION (a) Field of the Invention

The present invention relates to a receiving apparatus and method for an RFID reader, and more particularly, to an RFID which can reduce the tag recognition rate decrease caused by multipath fading.

(b) Description of the Related Art

Generally, RFID technology provides services such as positioning, remote processing, and managing of objects, information exchange between objects, etc., by attaching tags to each object, wirelessly recognizing unique identifiers (IDs) of the objects, and collecting, storing, processing, and tracking the corresponding information on the objects. The RFID technology is forecasted to form a new market by replacing the existing barcode and being applied to various fields such as material management, distribution, security, and so on.

A 900 MHz UHF RFID system is a passive type, and a data transmission scheme thereof uses backscatter modulation. The backscatter modulation is a method that transmits information on tags by changing the magnitude of scattered electromagnetic waves when the tags scatter continuous waves (CWs) sent from the reader and returns them to the reader.

According to the communication protocol of the passive RFID system, when the reader transmitter receives a baseband signal from a digital processor, for example, a modem, it alternately transmits a modulation signal and a continuous wave signal. When the reader transmitter transmits the modulation signal, the tag only receives the modulation signal but does not transmit a response signal, and therefore the reader receiver receives no signal. On the other hand, when the reader transmitter transmits a continuous wave, the tag transmits a response signal, and therefore the reader receiver receives and processes the response signal.

The tag absorbs a part of the continuous wave signal from the reader and reflects the rest of it. The reflected signal is a response signal from the tag. The tag information can be carried by changing the reflectivity.

The reader can receive the response signal while transmitting the continuous wave signal. Therefore, the reader uses the same frequency for transmission and reception.

Regarding data transmission between the tag and the reader, a continuous wave signal transmitted from the reader via a wireless communication channel returns as a backscatter modulated signal having the same frequency through tag impedance mismatch. At this time, the magnitude and phase of the returning backscatter modulation signal are severely distorted due to multipath fading in the surrounding environment or due to inter-tag interference caused by a high concentration of tags. This makes it difficult for the reader receiver to restore a response signal from a tag, thereby causing a decrease in tag recognition rate.

SUMMARY OF THE INVENTION

The present invention has been made in an effort to provide a receiving apparatus and method for an RFID reader which can reduce a tag recognition rate decrease caused by multipath fading.

An exemplary embodiment of the present invention provides a receiving apparatus for an RFID reader which receives response signals backscatter-modulated by a tag. The receiving apparatus for the RFID reader includes a plurality of receiving antennas, a plurality of channel estimators, a plurality of channel compensators, a combiner, and a comparator. The plurality of receiving antennas receive the response signals. The plurality of channel estimators estimate channel coefficients based on the signals received via the plurality of receiving antennas. The plurality of channel compensators compensate the signals received via the plurality of receiving antennas based on the channel coefficients estimated by the plurality of channel estimators. The combiner combines the compensated signals together to generate a combined channel signal. The comparator detects bits in the combined channel signal.

Each response signal includes a preamble signal, and the plurality of channel estimators may estimate channel coefficients by correlating a preamble signal received in a preamble section via the plurality of receiving antennas with an already known pilot signal.

The preamble signal may include an FM0 preamble signal or a Miller preamble signal.

The preamble signal may include a bit pattern represented by square wave subcarriers.

Each of the plurality of channel estimators may include: an I channel correlator that calculates a correlation value of an I channel signal received in the preamble section via the corresponding receiving antenna with the pilot signal; a Q channel correlator that calculates a correlation value of a Q channel signal received in the preamble section via the corresponding receiving antenna with the pilot signal; an energy calculator that calculates correlation energy values by using the correlation value of the I channel signal and the correlation value of the Q channel signal; and a channel coefficient calculator that calculates a channel coefficient of the I channel signal and a channel coefficient of the Q channel signal by using a maximum value among the correlation energy values calculated by the energy calculator during the period of the preamble section.

The energy calculator may calculate the correlation energy values by adding a square of the correlation value of the I channel signal and a square of the correlation value of the Q channel signal.

The receiving apparatus for the RFID reader may further include a plurality of preamble detectors. The plurality of preamble detectors may detect a start point of the preamble signal from the signals received via the plurality of receiving antennas by correlating the signals received via the plurality of receiving antennas with the pilot signal. The plurality of channel estimators may detect the preamble section from the detected start point of the preamble signal by the corresponding preamble detectors.

The plurality of channel compensators may multiply I and Q channel signals of a signal received subsequent to the preamble section via the corresponding receiving antennas by conjugates of the channel coefficients estimated by the corresponding channel estimators.

The plurality of channel compensators may multiply I and Q channel signals of a signal received subsequent to the preamble section via the corresponding receiving antennas by normalized values of the conjugates of the channel coefficients estimated by the corresponding channel estimators.

An exemplary embodiment of the present invention provides a receiving method for an RFID reader which receives response signals backscatter-modulated by a tag. The receiving method for the RFID reader includes: receiving the response signals via a plurality of receiving antennas; estimating channel coefficients for each of the plurality of receiving antennas based on the response signals received via the plurality of receiving antennas; compensating the response signals received via the plurality of receiving antennas based on the channel coefficients estimated for each of the plurality of receiving antennas; combining the compensated response signals for each of the plurality of receiving antennas together to generate a combined channel signal; and detecting bits in the combined channel signal.

Each response signal includes tag information and a preamble signal prior to the tag information, and the estimating may include: detecting the start point of the preamble signal from the response signals received via the plurality of receiving antennas; and estimating channel coefficients for each of the plurality of receiving antennas by using a correlation value between the preamble signal received via the plurality of receiving antennas and an already known pilot signal.

The preamble signal may include an FMO preamble signal or a Miller preamble signal.

The detecting of the start point of the preamble signal may include detecting the start point of the preamble signal from a signal received via a corresponding receiving antenna by correlating a signal received via the corresponding receiving antenna with the pilot signal.

The compensating may include multiplying a signal received subsequent to the preamble signal via the plurality of receiving antennas by conjugates of the channel coefficients estimated for each of the plurality of receiving antennas.

The compensating may include multiplying a signal received subsequent to the preamble signal via the plurality of receiving antennas by normalized values of conjugates of the channel coefficients estimated for each of the plurality of receiving antennas.

The detecting may include: calculating a first correlation value by correlating a reference signal of bit 0 with the combined channel signal; calculating a second correlation value by correlating a reference signal of bit 1 with the combined channel signal; and determining whether the combined channel signal is bit 0 or bit 1 by comparing the first and second correlation values.

DETAILED DESCRIPTION OF THE EMBODIMENTS

Figure 1:
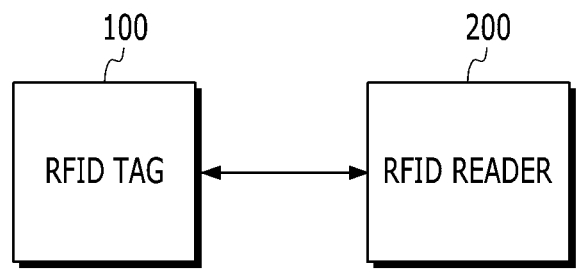
FIG. 1 is a view showing an RFID system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

Now, a receiving apparatus and method for an RFID reader according to an exemplary embodiment of the present invention will be described in detail with reference to the drawings.

FIG. 1 is a view showing an RFID system according to an exemplary embodiment of the present invention.

Referring to FIG. 1, the RFID system includes an RFID tag 100 and an RFID reader 200.

When an object with the RFID tag 100 is put in a read zone of the RFID reader 200, the RFID reader 200 transmits an interrogation signal to the RFID tag 100 and the RFID tag 100 responds to the interrogation signal from the RFID reader 200. That is, the RFID reader 200 transmits an interrogation signal to the RFID tag 100 by modulating a specific radio frequency (RF) signal, and the RFID tag 100 passes a unique identification code and data information (hereinafter referred to as "tag information") stored in an internal memory by backscatter-modulating the RF signal sent from the RFID reader 200 to the RFID reader 200. That is, the signal backscatter-modulated by the RFID tag 100 is a response signal from the RFID tag 100.

The backscatter-modulated signal returning to the RFID reader 200 from the RFID tag 100 may be affected by multipath fading in the surrounding environment, thus distorting the magnitude and phase of the response signal. Multipath fading refers to irregular fluctuations in amplitude and phase at a particular place which result from interactions between radio waves received via different paths due to multiple reflections from several objects. Multipath fading can cause a significant decrease in the tag recognition rate of the RFID reader 200. The RFID reader 200, which is capable of reducing the tag recognition rate decrease caused by multipath fading, will be described below in detail.

Figure 2:
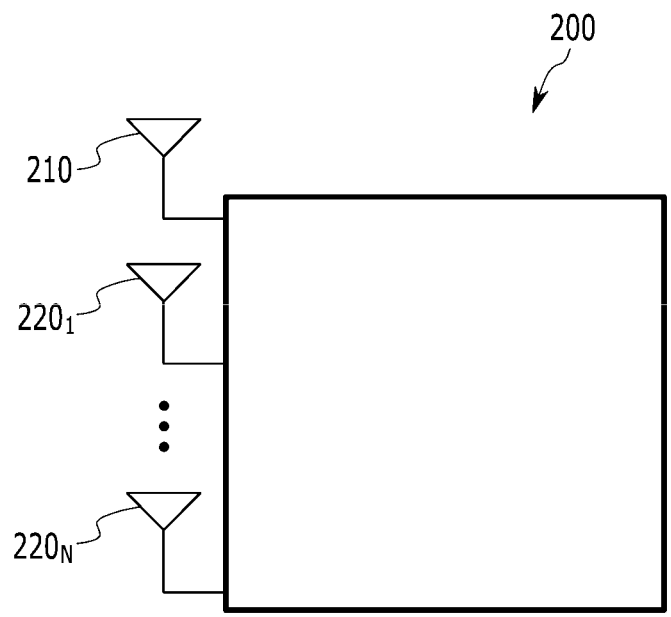
FIG. 2 is a view schematically showing an RFID reader according to an exemplary embodiment of the present invention.

FIG. 2 is a view schematically showing an RFID reader according to an exemplary embodiment of the present invention.

Referring to FIG. 2, the RFID reader 200 has a SIMO (single input multiple output) structure using one transmitting antenna 210 and a plurality of receiving antennas $220_1$ to $220_N$.

The RFID reader 200 restores tag information from tag response signals received via the plurality of receiving antennas $220_1$ to $220_N$. That is, the RFID reader 200 restores tag information by multiplying the tag response signals received via the plurality of receiving antennas $220_1$ to $220_N$ by individual weights and combining the signals together.

While any one of the signals received via multiple channels between the tag antenna of the RFID tag 100 and the plurality of receiving antennas $220_1$ to $220_N$ of the RFID reader 200 is experiencing deep fading, the other signals are less likely to experience deep fading. Accordingly, the RFID reader 200 can improve the recognition rate of the RFID tag 100 because a dead zone caused by multipath fading is eliminated by multiplying the tag response signals received via the plurality of receiving antennas $220_1$ to $220_N$ by proper weights and combining the signals together.

Next, a signal receiving method for an RFID reader according to an exemplary embodiment of the present invention will be described in detail with reference to FIGS. 3 to 9.

Figure 3:
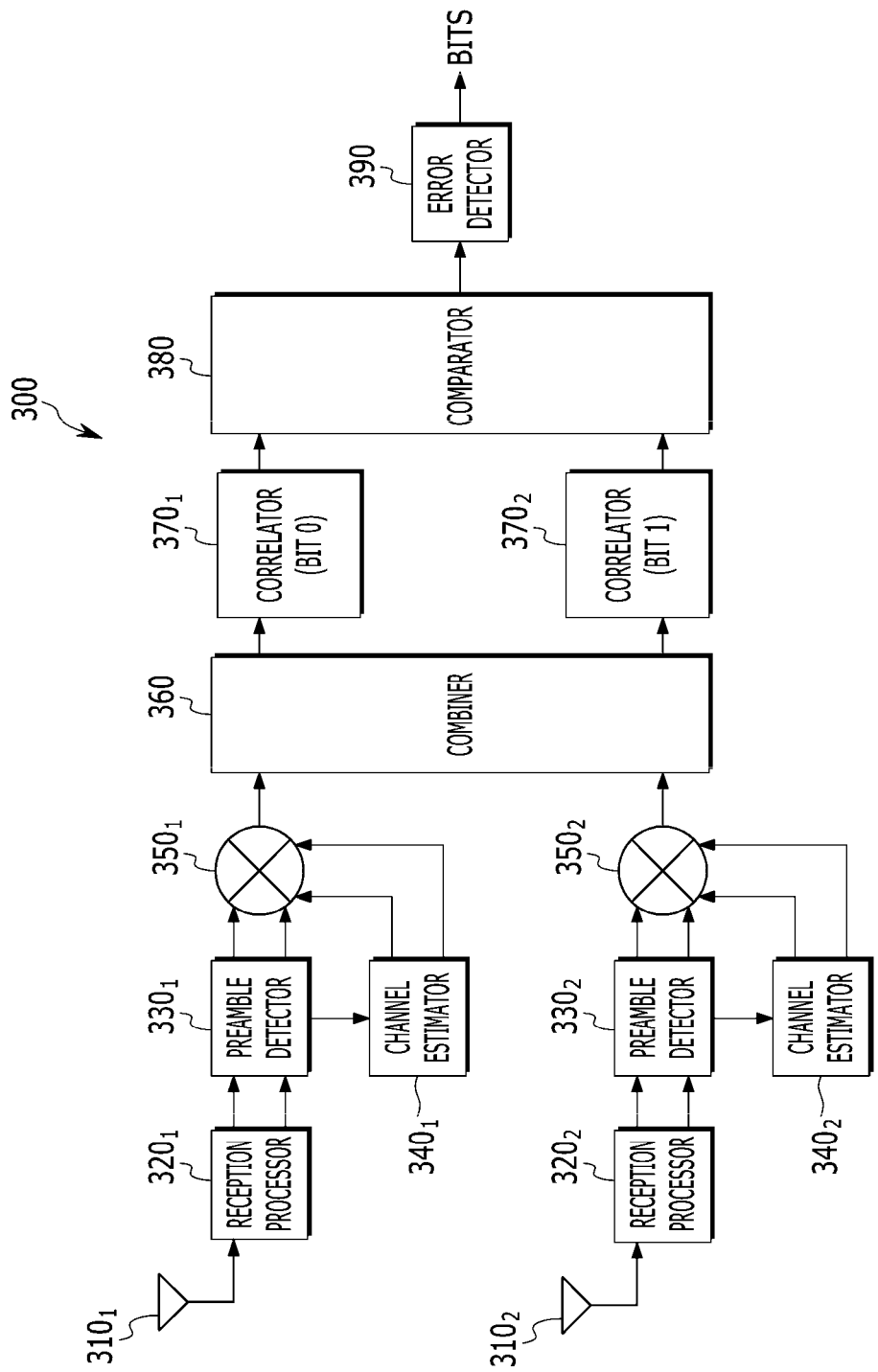
FIG. 3 is a view showing a receiving apparatus for an RFID reader according to an exemplary embodiment of the present invention.

FIG. 3 is a view showing a receiving apparatus for an RFID reader according to an exemplary embodiment of the present invention.

Referring to FIG. 3, the receiving apparatus 300 of the RFID reader 1200 includes receiving antennas $310_1$ and $310_2$, reception processors $320_1$ and $320_2$, preamble detectors $330_1$ and $330_2$, channel estimators $340_1$ and $340_2$, channel compensators $350_1$ and $350_2$, a combiner 360, correlators $370_1$ and $370_2$, a comparator 380, and an error detector 390.

The number of reception processors $320_1$ and $320_2$, the number of preamble detectors $330_1$ and $330_2$, the number of channel estimators $340_1$ and $340_2$, and the number of channel compensators $350_1$ and $350_2$ correspond to the number of receiving antennas $310_1$ and $310_2$. Although FIG. 3 illustrates only two receiving antennas $310_1$ and $310_2$ for convenience of explanation, more than two receiving antennas may exist.

The receiving antennas $310_1$ and $310_2$ receive tag response signals from the RFID tag 100.

The reception processors $320_1$ and $320_2$ perform signal processing on the tag response signals (hereinafter referred to as "received signals") which are received via the receiving antennas $310_1$ and $310_2$. The reception processors $320_1$ and $320_2$ perform frequency conversion and filtering on the received signal, analog-to-digital convert I and Q channel signals of the received signal, and filter the digital-converted I and Q channel signals to eliminate out-of-band signals.

The preamble detectors $330_1$ and $330_2$ detect the start point of a preamble signal from the filtered I and Q channel signals of the received signal. The preamble detectors $330_1$ and $330_2$ can detect the start point of a preamble signal by matching the filtered I and Q channel signals with preamble bit patterns (preamble signals) of the tags defined in the UHF band RFID international standard ISO/IEC 18000-63.

When the start point of a preamble signal is detected, the channel estimator $340_1$ and $340_2$ determine that the preamble signal starts at this time, and estimate I and Q channel coefficients based on I and Q channel signals received from this point of time forward. Also, the channel estimators $340_1$ and $340_2$ can estimate the I and Q channel coefficients by matching the I and Q channel signals with preamble bit patterns (preamble signals) of the tags defined in the UHF band RFID international standard ISO/IEC 18000-63. The preamble signals of the tags defined in ISO/IEC 18000-63 include an FM0 preamble signal and a Miller preamble signal.

The channel compensators $350_1$ and $350_2$ compensate the I and Q channel signals of a signal received subsequent to the preamble signal, by using the I and Q channel coefficients estimated by the channel estimators $340_1$ and $340_2$.

The combiner 360 combines the I and Q channel signals, which are compensated by the channel compensators $350_1$ and $350_2$, together to generate a combined channel signal.

The correlator $370_1$ has a reference signal of bit 0, correlates the reference signal of bit 0 with the combined channel signal, and outputs the correlation value to the comparator 380.

The correlator $370_2$ has a reference signal of bit 1, correlates the reference signal of bit 1 with the combined channel signal, and outputs the correlation value to the comparator 380.

The comparator 380 compares the correlation values from the correlators $370_1$ and $370_2$ to determine whether a signal received by the receiving apparatus 300 of the RFID reader 200 is bit 0 or bit 1 and to thereby detect bits transmitted from the RFID tag 100.

The error detector 390 detects errors by running a CRC (cyclic redundancy check) on the detected bits, and if there are no errors in the detected bits, determines that the detected bits are final restored data.

Figure 4:
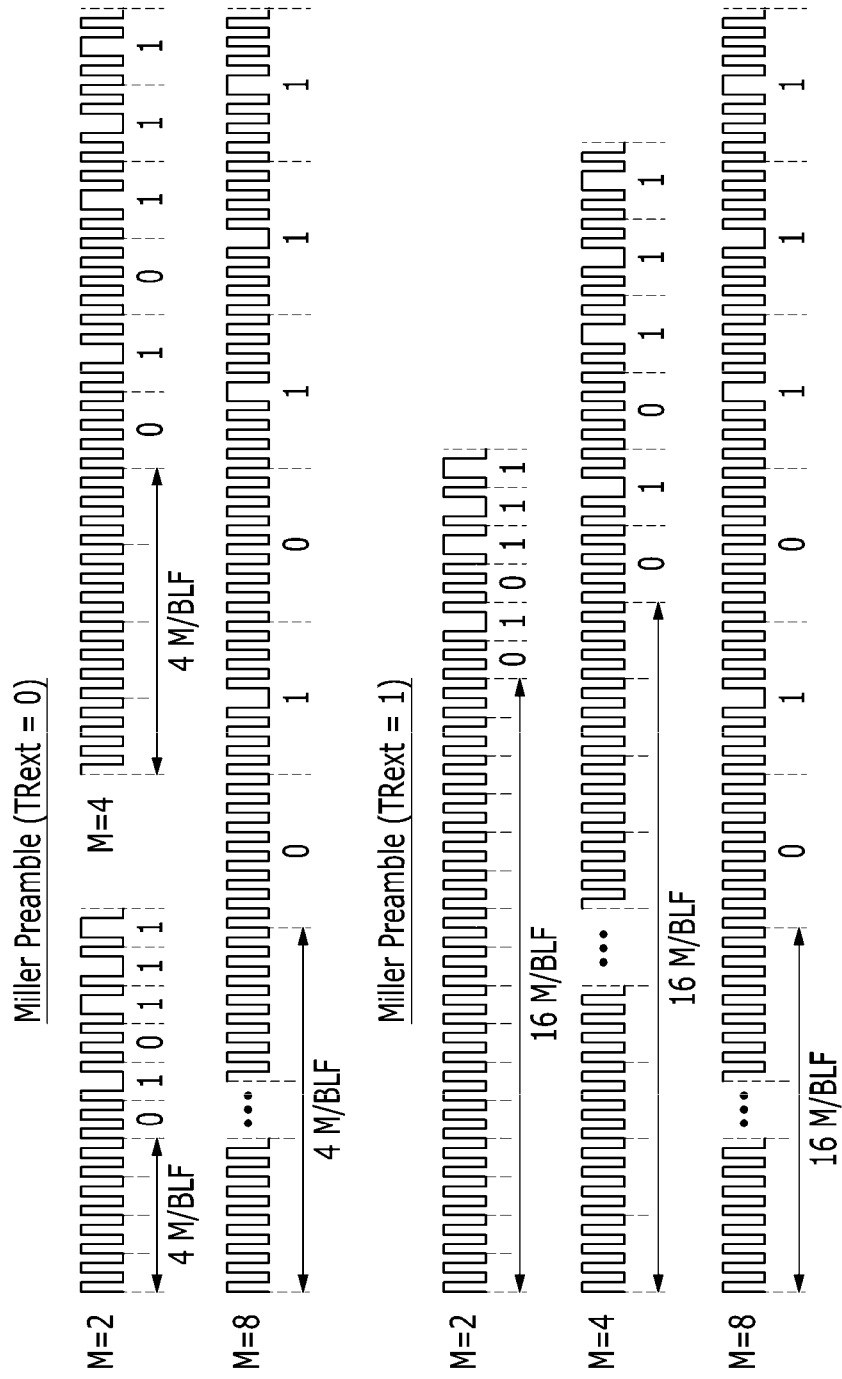
FIG. 4 is a view showing the structure of the Miller preamble signal defined in ISO/IEC 18000-63.

FIG. 4 is a view showing the structure of the Miller preamble signal defined in ISO/IEC 18000-63, a detailed description of which will be omitted.

Referring to FIG. 4, of the preamble signal used in the RFID tag 100 may be determined according to the M value.

M denotes the number of subcarrier cycles per symbol. For example, if M=4, four cycles of square wave subcarriers can be used to represent bit 0.

The RFID tag 100 and the RFID reader 200 uses a specific preamble bit pattern defined by {0, 1, 0, 1, 1, 1}, among the preamble signals shown in FIG. 4. The number of bits used may vary depending on the structure of the receiving apparatus. In reality, the length of a pilot signal [p(n)] used for channel estimation by the RFID reader 200 is more than 6 bits. This is because several cycles of a square wave are used to represent 1 bit. For example, if M=4, a total of 24 cycles of square wave subcarriers are used to represent 6 bits. Since a phase inversion exists in the middle of each subcarrier square wave, a total of 48 high/low values are used to represent 6 bits. Accordingly, using 6 bits for channel estimation is in reality the equivalent of the RFID reader 200's performing channel estimation by using a pilot signal with the length of 24 square waves having high and low values.

Figure 5:
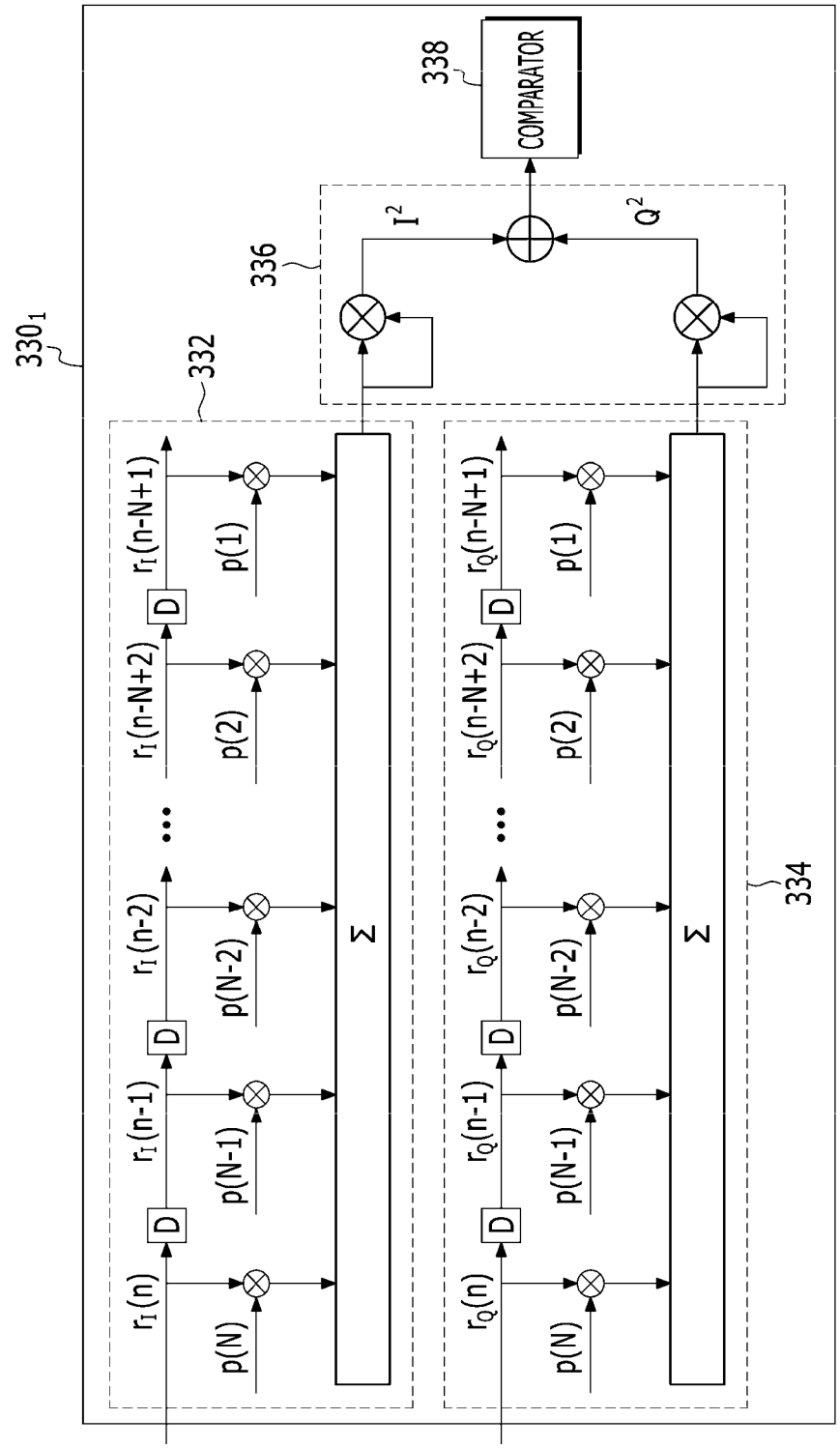
FIG. 5 is a view showing a preamble detector of FIG. 3.

FIG. 5 is a view showing a preamble detector of FIG. 3. FIG. 5 illustrates only one ($330_1$) of the preamble detectors $330_1$ and $330_2$, and the preamble detector $330_2$ can be configured in the same manner as the preamble detector $330_1$.

Referring to FIG. 5, the preamble detector $330_1$ includes an I channel correlator 332, a Q channel correlator 334, an energy calculator 336, and a comparator 338.

The I channel correlator 332 calculates the correlation value of an I channel signal by multiplying the I channel signal [$r_I(n)$] currently being input in units of bits and the previously input (N−1) I channel signal [$r_I$ n−1, ..., $r_I$(n−N+1)] by the bits [p(N), p N−1, ..., p 1] of a pilot signal [p(n)] of length N and adding the signals together. The I channel correlator 332 can store the previously input (N−1) I channel signal [$r_I$ n−1, ..., $r_I$(n−N+1)] through a plurality of delay elements such as D flip-flops connected in series.

The correlation value of an I channel signal can be calculated according to Equation 1. The pilot signal [p(n)] of length N is the same signal as the preamble bit pattern of the preamble signal.

$$E_I(n) = \sum_{k=1}^{N} p(k) r_I(n - (N - k)) \quad \text{(Equation 1)}$$

The Q channel correlator 334 calculates the correlation value of a Q channel signal by multiplying the Q channel signal [$r_Q(n)$] currently input in units of bits and the previously input (N−1) Q channel signals [$r_Q$ n−1, ..., $r_Q$(n−N+1)] by the bits [p(N), p N−1, ..., p 1] of a pilot signal [p(n)] of length N and adding the signals together. The Q channel correlator 334 can store the previously input (N−1) I channel signals [$r_Q$ n−1, ..., $r_Q$(n−N+1)] through a plurality of delay elements D such as D flip-flops connected in series.

The correlation value of a Q channel signal can be calculated according to Equation 2.

$$E_Q(n) = \sum_{k=1}^{N} p(k) r_Q(n-(N-k))$$ (Equation 2)

The energy calculator 336 calculates the sum of the energy values of I and Q channel signals by using the correlation value of the I channel signal calculated by the I channel correlator 332 and the correlation value of the Q channel signal calculated by the Q channel correlator 334. The energy of the I channel signal can be calculated by finding the square ($E_I^2$) of the correlation value of the I channel signal, and the energy of the Q channel signal can be calculated by finding the square ($E_Q^2$) of the correlation value of the Q channel signal. That is, the energy calculator 336 can calculate the sum of the energy values of the I and Q channel signals from the sum ($E_I^2 + E_Q^2$) of the square ($E_I^2$) of the correlation value of the I channel signal and the square ($E_Q^2$) of the correlation value of the Q channel signal.

The comparator 338 compares the energy values calculated by the energy calculator 336 with a predetermined threshold, and determines that the time at which the energy values exceed the threshold is the start point of the preamble signal. The comparator 338 reports the start point of the preamble signal to the preamble estimator $340_1$.

Figure 6:
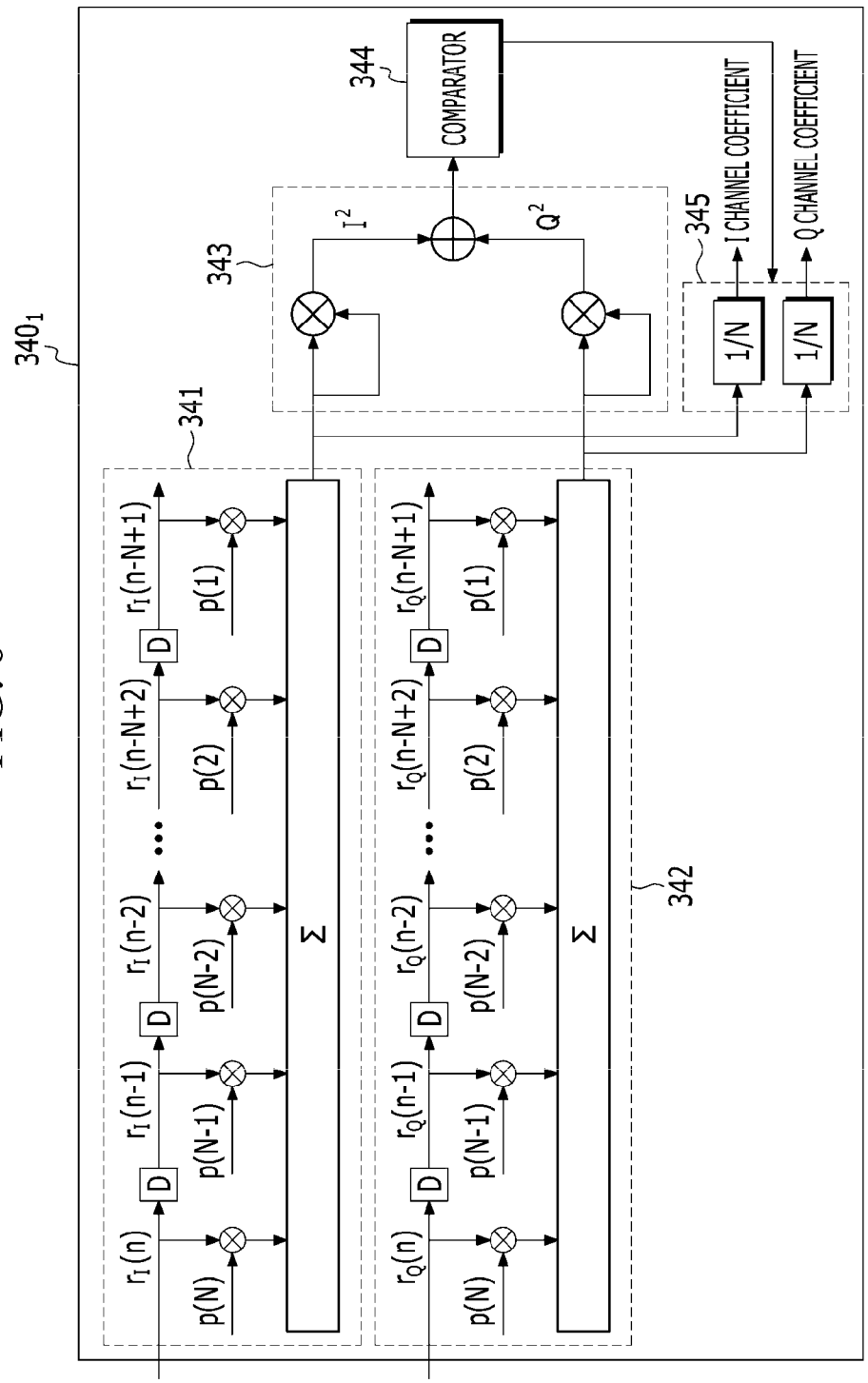
FIG. 6 is a view showing a channel estimator of FIG. 3.

FIG. 6 is a view showing a channel estimator of FIG. 3. FIG. 6 illustrates only one ($340_1$) of the preamble estimators $340_1$ and $340_2$, and the channel estimator $340_2$ can be configured in the same manner as the channel estimator $340_1$.

Referring to FIG. 6, the channel estimator $340_1$ includes an I channel correlator 341, a Q channel correlator 342, an energy calculator 343, a comparator 338, and a channel coefficient calculator 345.

The functions of the Q channel correlator 341, Q channel correlator 342, and energy calculator 343 are identical to those of the I channel correlator 332, Q channel correlator 334, and energy calculator 336, which have been explained based on FIG. 5, so a detailed description thereof will be omitted. However, the I channel correlator 341 and the Q channel correlator 342 regard a signal received at the detected start point of the preamble signal as a preamble signal, and calculate the correlation value between the signal received at the detected start time of the preamble signal and a pilot signal.

The comparator 344 detects the maximum value among the energy values calculated by the energy calculator 343 during the period of length N since the detected start point of the preamble signal, and reports it to the channel coefficient calculator 345.

The channel coefficient calculator 345 calculates the channel coefficient of an I channel by multiplying the maximum correlation value of an I channel signal detected by the comparator 344 by the reciprocal of the length N of the pilot signal, and calculates the channel coefficient of a Q channel by multiplying the maximum correlation value of a Q channel signal detected by the comparator by the reciprocal of the length N of the pilot signal.

The signals $[r_I(n), r_Q(n)]$ received by the channel estimator $340_1$ can be represented by Equation 3, and the channel coefficients $\hat{h}_I$ and $\hat{h}_Q$ of the I and Q channels can be estimated by Equation 4 and Equation 5.

$$r_I(n) = h_I p(n) + z_I(n)$$

$$r_Q(n) = h_Q p(n) + z_Q(n)$$ (Equation 3)

In Equation 3, p(n) denotes a transmitted signal. $z_I(n)$ is an I channel noise signal, and $z_Q(n)$ is a Q channel noise signal.

$$\hat{h}_I = \frac{1}{N} \sum_{k=1}^{N} p*(k) r_I(n-(N-k))$$

$$= \frac{1}{N} \sum_{k=1}^{N} \{|p(k)|^2 h_I + \text{noise}\} = \frac{1}{N} \sum_{k=1}^{N} \{h_I + \text{noise}\}$$ (Equation 4)

$$\hat{h}_Q = \frac{1}{N} \sum_{k=1}^{N} p*(k) r_Q(n-(N-k))$$

$$= \frac{1}{N} \sum_{k=1}^{N} \{|p(k)|^2 h_Q + \text{noise}\} = \frac{1}{N} \sum_{k=1}^{N} \{h_Q + \text{noise}\}$$ (Equation 5)

Channel compensation is carried out using the channel coefficients obtained based on the number of receiving antennas. There are basically two methods of obtaining the diversity gain of the receiving apparatus 300 by channel compensation. One of them is MRC (Maximal Ratio Combining), and the other one is EGC (Equal Gain Combining).

Assuming that the number of receiving antennas is L, MRC is a method of increasing the SNR of a received signal by applying individual weights to L received signals to perform channel compensation and then combining the L signals on which channel compensation is performed. That is, MRC is a method of channel compensation in which the magnitude and phase of channel coefficients for each receiving antenna are estimated, a receiving signal having a greater channel coefficient is deemed as having higher reception performance, and a higher weight is applied to a receiving signal having a greater channel coefficient.

EGG is a method of increasing the SNR of a received signal by applying the same weight to L received signals to perform channel compensation and then combining the L channel compensated signals together. That is, EGC is EGC is a method in which the magnitude and phase of channel coefficients for each receiving antenna are estimated, the values of the channel coefficients for each receiving antenna is normalized, and the normalizd values of the channel coefficients by a signal received for each receiving antenna are multiplied, and then multiplied signals are combined.

The channel compensation method for MRC will be described in detail with reference to FIG. 7, and the channel compensation method for EGC will be described in detail with reference to FIG. 8.

Figure 7:
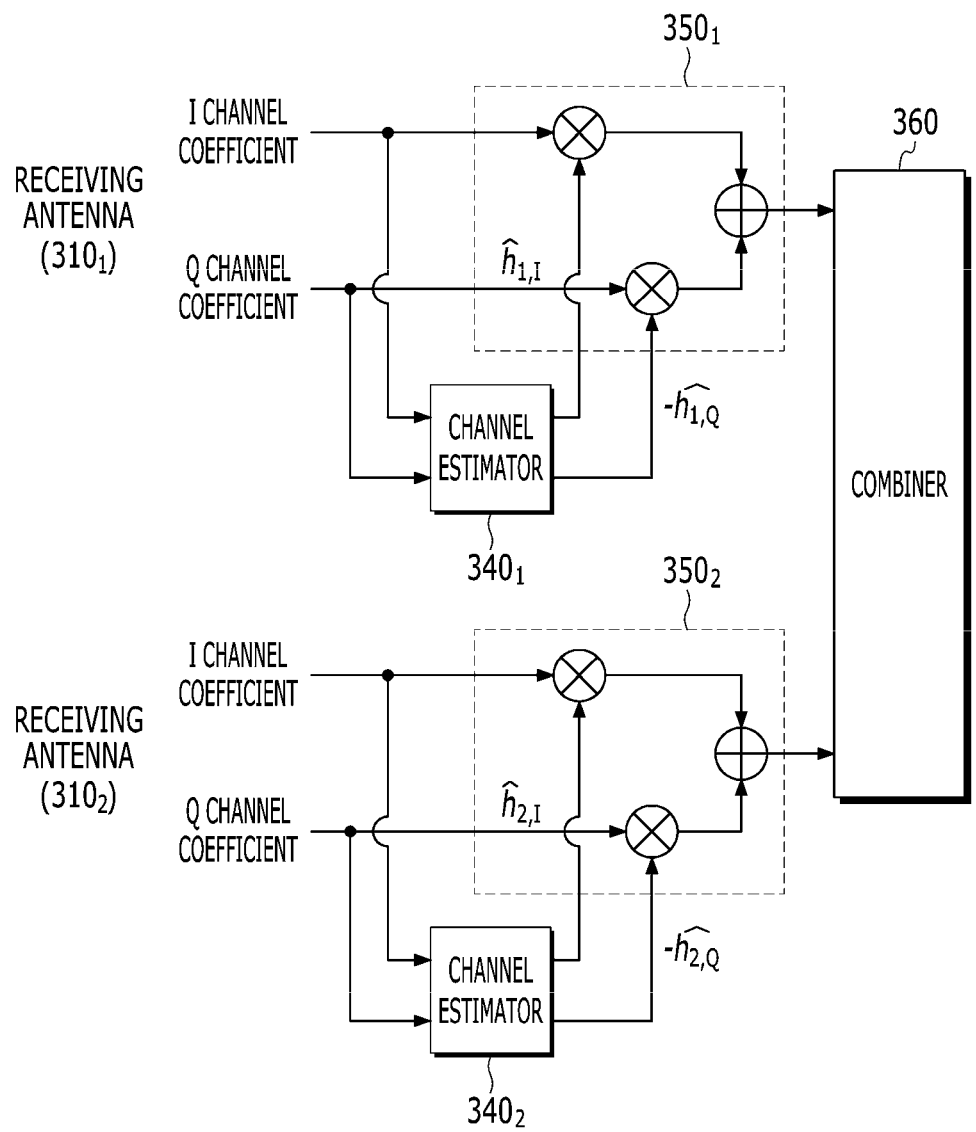
FIG. 7 is a view showing an example of the channel compensators of FIG. 3.

FIG. 7 is a view showing an example of the channel compensators of FIG. 3.

Referring to FIG. 7, when I and Q channel coefficients for the receiving antennas $310_1$ and $310_2$ are estimated, the channel compensators $350_1$ and $350_2$ compensate channels of a received signal by obtaining the conjugates of channel signals estimated for each of the receiving antennas $310_1$ and $310_2$ and multiplying a signal received subsequent to the preamble signal by the conjugates. The magnitude of the conjugate is a weight.

Specifically, assuming that the channel signals corresponding the receiving antenna $310_1$ and $310_2$ and estimated by the channel estimators $340_1$ and $340_2$ are $\hat{h}_1 = \widehat{h_{1,I}} + j\widehat{h_{1,Q}}$ and $\hat{h}_2 = \widehat{h_{2,I}} + j\widehat{h_{2,Q}}$, respectively, the channel compensator $350_1$ obtains the conjugate $\widehat{h_{1,I}} - j\widehat{h_{1,Q}}$ of the channel signal $\hat{h}_1 = \widehat{h_{1,I}} + j\widehat{h_{1,Q}}$ multiplies the I channel signal of a signal received subsequent to the preamble signal via the receiving antenna $310_1$ by the real number $\widehat{h}_{1,I}$ of the conjugate $\widehat{h}_{1,I} - j\widehat{h}_{1,Q}$ and multiplies the Q channel signal by the imaginary number $\widehat{h}_{1,Q}$ of the conjugate $\widehat{h}_{1,I} - j\widehat{h}_{1,Q}$ and combines the two signals together. Also, the channel estimator $350_2$ obtains the conjugate $\widehat{h}_{2,I} - j\widehat{h}_{2,Q}$ of the channel coefficient $\widehat{h}_2 = \widehat{h}_{2,I} + j\widehat{h}_{2,Q}$, multiplies the I channel signal of a signal received subsequent to the preamble signal via the receiving antenna $310_2$ by the real number $\widehat{h}_{2,I}$ of the conjugate $\widehat{h}_{2,I} - j\widehat{h}_{2,Q}$ and multiplies the Q channel signal by the imaginary number $\widehat{h}_{2,Q}$ of the conjugate $\widehat{h}_{2,I} - j\widehat{h}_{2,Q}$ and combines the two signals together.

By doing so, the diversity gain of the receiving apparatus 300 can be improved up to 3 dB in terms of SNR (signal-to-noise ratio).

Figure 8:
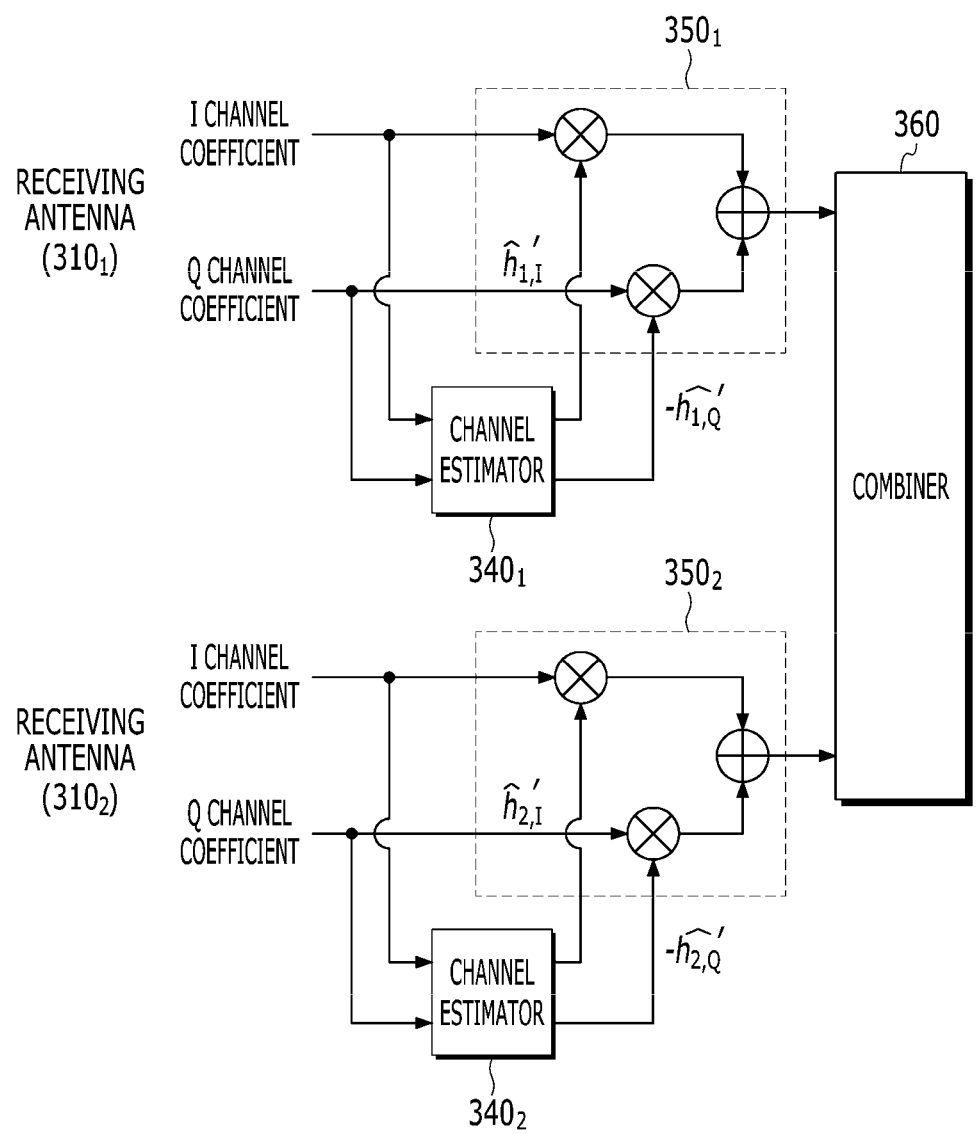
FIG. 8 is a view showing another example of the channel compensators of FIG. 3.

FIG. 8 is a view showing another example of the channel compensators of FIG. 3.

Referring to FIG. 8, when I and Q channel coefficients for the receiving antennas $310_1$ and $310_2$ are estimated, the channel compensators $350_1$ and $350_2$ compensate channels of a received signal by normalizing the magnitude of the conjugates of channel signals estimated for each of the receiving antennas $310_1$ and $310_2$, obtaining the normalized conjugates of the channel signals, and multiplying a signal received subsequent to the preamble signal by the conjugates.

Specifically, assuming that the channel signals for the receiving antenna $310_1$ and $310_2$ and estimated by the channel estimators $340_1$ and $340_2$ are $\widehat{h}_1 = \widehat{h}_{1,I} + j\widehat{h}_{1,Q}$ and $\widehat{h}_2 = \widehat{h}_{2,I} + j\widehat{h}_{2,Q}$, respectively, the channel compensators $350_1$ and $350_2$ normalize the magnitude of the channel signals $\widehat{h}_1 = \widehat{h}_{1,I} + j\widehat{h}_{1,Q}$ and $\widehat{h}_2 = \widehat{h}_{2,I} + j\widehat{h}_{2,Q}$, corresponding to the receiving antennas $310_1$ and $310_2$.

The magnitude of the channel signals $\widehat{h}_1 = \widehat{h}_{1,I} + j\widehat{h}_{1,Q}$ and $\widehat{h}_2 = \widehat{h}_{2,I} + j\widehat{h}_{2,Q}$, from the receiving antennas can be normalized by Equation 6 and Equation 7.

$$h_{1,I}\hat{}' = \frac{\hat{h}_{1,I}}{\sqrt{\hat{h}_{1,I}^2 + \hat{h}_{1,Q}^2}}, \quad h_{1,Q}\hat{}' = \frac{\hat{h}_{1,Q}}{\sqrt{\hat{h}_{1,I}^2 + \hat{h}_{1,Q}^2}} \quad \text{(Equation 6)}$$

$$h_{2,I}\hat{}' = \frac{\hat{h}_{2,I}}{\sqrt{\hat{h}_{2,I}^2 + \hat{h}_{2,Q}^2}}, \quad h_{2,Q}\hat{}' = \frac{\hat{h}_{2,Q}}{\sqrt{\hat{h}_{2,I}^2 + \hat{h}_{2,Q}^2}} \quad \text{(Equation 7)}$$

The channel compensators $350_1$ and $350_2$ obtain the conjugates $\widehat{h}_{1,I}' - j\widehat{h}_{1,Q}'$ and $\widehat{h}_{2,I}' - j\widehat{h}_{2,Q}'$ of the normalized channel signals $\widehat{h}_{1,I}' + j\widehat{h}_{1,Q}'$ and $\widehat{h}_{2,I}' + j\widehat{h}_{2,Q}'$.

The channel compensator $350_1$ multiplies the I channel signal of a signal received subsequent to the preamble signal via the receiving antenna $310_1$ by the real number $\widehat{h}_{1,I}'$ of the conjugate $\widehat{h}_{1,I}' - j\widehat{h}_{1,Q}'$ and multiplies the Q channel signal by the imaginary number $\widehat{h}_{1,Q}'$ of the conjugate $\widehat{h}_{1,I}' - j\widehat{h}_{1,Q}'$, combines the two signals together, and outputs the resulting value to the combiner 360.

Also, the channel compensator $350_2$ multiplies the I channel signal of a signal received subsequent to the preamble signal via the receiving antenna $310_2$ by the real number $\widehat{h}_{2,I}'$ of the conjugate $\widehat{h}_{2,I}' - j\widehat{h}_{2,Q}'$ and multiplies the Q channel signal by the imaginary number $\widehat{h}_{2,Q}'$ of the conjugate $\widehat{h}_{2,I}' - j\widehat{h}_{2,Q}'$ combines the two signals together, and outputs the resulting value to the combiner 360.

Even if the number of receiving antennas increases, both the MRC and EGC techniques can be applied by extending the methods of FIGS. 7 and 8 in parallel by the number of receiving antennas.

Figure 9:
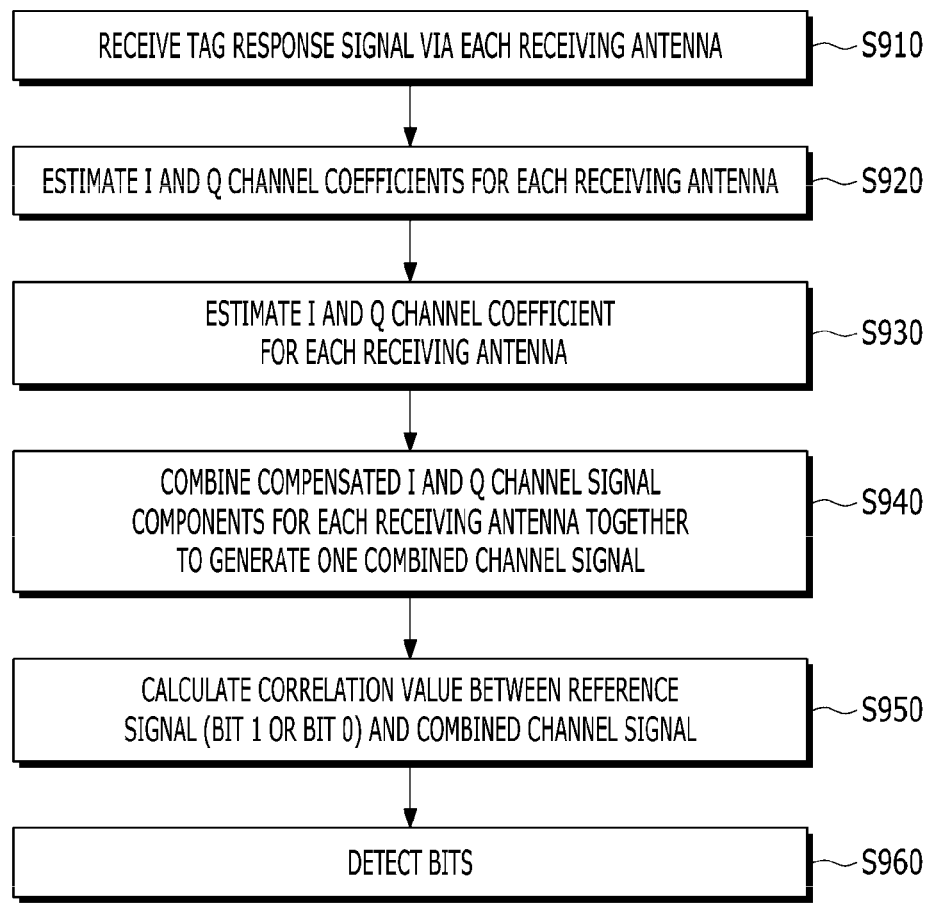
FIG. 9 is a flowchart showing a signal receiving method for an RFID reader according to an exemplary embodiment of the present invention.

FIG. 9 is a flowchart showing a signal receiving method for an RFID reader according to an exemplary embodiment of the present invention.

Referring to FIG. 9, the receiving antennas $310_1$ and $310_2$ receive backscatter-modulated tag response signals from the RFID tag 100 (S910). The tag response signals received via the receiving antennas $310_1$ and $310_2$ are processed by the reception processors $320_1$ and $320_2$ and passed to the preamble detectors $330_1$ and $330_2$.

The preamble detectors $330_1$ and $330_2$ detect the start point of a preamble signal from the I and Q channel signals of the signal processed by the reception processors $320_1$ and $320_2$ (S920).

Next, the channel estimators $340_1$ and $340_2$ estimate I and Q channel coefficients for each of the receiving antennas $310_1$ and $310_2$ based on the I and Q channel signals received since the start point of the preamble signal forward (S930), and the channel compensators $350_1$ and $350_2$ compensate the I and Q channel signals of a signal received subsequent to the preamble signal by using the estimated I and Q channel coefficients (S940).

The combiner 360 combines the I and Q channel signals, which are compensated by the channel compensators $350_1$ and $350_2$, together to generate a combined channel signal (S950), and the correlators $370_1$ and $370_2$ calculate the correlation value between their own reference signal and the combined channel signal (S960).

The comparator 380 determines whether a combined channel signal is bit 0 or bit 1 based on the correlation values from the correlators $370_1$ and $370_2$ (S960).

Next, the error detector 390 detects any errors in the detected bits.

According to an embodiment of the present invention, unlike a conventional RFID reader having a single channel and a signal antenna, the RFID reader includes multiple antennas and multiple channels, and the RFID tag recognition rate can be improved because a dead zone caused by multi-path fading is eliminated by a signal processing procedure of applying proper weights to received tag response signals and combining the signals together.

An exemplary embodiment of the present invention may not only be embodied through the above-described apparatus and method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A receiving apparatus for an RFID reader which receives response signals backscatter-modulated by a tag, the receiving apparatus comprising:
    a plurality of receiving antennas that receive the response signals;
    a plurality of channel estimators that estimate channel coefficients based on the signals received via the plurality of receiving antennas;
    a plurality of channel compensators that compensate the signals received via the plurality of receiving antennas based on the channel coefficients estimated by the plurality of channel estimators;
    a combiner that combines the compensated signals together to generate a combined channel signal; and
    a comparator that detects bits in the combined channel signal,
    wherein each response signal comprises a preamble signal, and the plurality of channel estimators estimate the channel coefficients by correlating the preamble signal in a preamble section received via the plurality of receiving antennas with an already known pilot signal, and
    wherein each of the plurality of channel estimators comprises:
        an I channel correlator that calculates a correlation value of an I channel signal in the preamble section received via the corresponding receiving antenna with the pilot signal;
        a Q channel correlator that calculates a correlation value of a Q channel signal in the preamble section received via the corresponding receiving antenna with the pilot signal;
        an energy calculator that calculates correlation energy values by using the correlation value of the I channel signal and the correlation value of the Q channel signal; and
        a channel coefficient calculator that calculates a channel coefficient of the I channel signal and a channel coefficient of the Q channel signal by using a maximum value among the correlation energy values calculated by the energy calculator while the preamble section is received.

2. The receiving apparatus of claim 1, wherein the preamble signal comprises an FMO preamble signal or a Miller preamble signal.

3. The receiving apparatus of claim 1, wherein the preamble signal comprises a bit pattern represented by a subcarrier square wave.

4. The receiving apparatus of claim 1, wherein the energy calculator calculates the correlation energy values by adding a square of the correlation value of the I channel signal and a square of the correlation value of the Q channel signal.

5. The receiving apparatus of claim 1, further comprising a plurality of preamble detectors that detect a start point of the preamble signal from the signals received via the plurality of receiving antennas by correlating the signals received via the plurality of receiving antennas with the pilot signal,
    wherein the plurality of channel estimators detect the preamble section from the detected start point of the preamble signal by the corresponding preamble detectors.

6. The receiving apparatus of claim 1, wherein the plurality of channel compensators multiply I and Q channel signals of a signal received subsequent to the preamble section via the corresponding receiving antennas by conjugates of the channel coefficients estimated by the corresponding channel estimators.

7. The receiving apparatus of claim 1, wherein the plurality of channel compensators multiply I and Q channel signals of a signal received subsequent to the preamble section via the corresponding receiving antennas by normalized values of conjugates of the channel coefficients estimated by the corresponding channel estimators.

8. A receiving method for an RFID reader which receives response signals backscatter-modulated by a tag, the receiving method comprising:
    receiving the response signals via a plurality of receiving antennas;
    estimating channel coefficients for each of the plurality of receiving antennas based on the response signals received via the plurality of receiving antennas;
    compensating the response signals received via the plurality of receiving antennas based on the estimated channel coefficients for each of the plurality of receiving antennas;
    combining the compensated response signals for each of the plurality of receiving antennas together to generate a combined channel signal; and
    detecting bits in the combined channel signal,
    wherein the detecting comprises:
        calculating a first correlation value by correlating a reference signal of bit 0 with the combined channel signal;
        calculating a second correlation value by correlating a reference signal of bit 1 with the combined channel signal; and
        determining whether the combined channel signal is bit 0 or bit 1 by comparing the first and second correlation values.

9. The receiving method of claim 8, wherein each response signal comprises tag information and a preamble signal prior to the tag information, and
    wherein the estimating comprises:
        detecting a start point of the preamble signal from the response signals received via the plurality of receiving antennas; and
        estimating the channel coefficients for each of the plurality of receiving antennas by using a correlation value between the preamble signal received via the plurality of receiving antennas and an already known pilot signal.

10. The receiving method of claim 9, wherein the preamble signal comprises an FMO preamble signal or a Miller preamble signal.

11. The receiving method of claim 9, wherein the preamble signal comprises a bit pattern represented by a subcarrier square wave.

12. The receiving method of claim 9, wherein the detecting of the start point of the preamble signal comprises detecting the start point of the preamble signal from a signal received via a corresponding receiving antenna by correlating the signal received via the corresponding receiving antenna with the pilot signal.

13. The receiving method of claim 9, wherein the compensating comprises multiplying a signal received subsequent to the preamble signal via the plurality of receiving antennas by conjugates of the channel coefficients estimated for each of the plurality of receiving antennas.

14. The receiving method of claim 9, wherein the compensating comprises multiplying a signal received subsequent to the preamble signal via the plurality of receiving antennas by normalized values of conjugates of the channel coefficients estimated for each of the plurality of receiving antennas.

15. The receiving method of claim 8, further comprising detecting errors from the detected bits.

16. The receiving method of claim 8, wherein each response signal comprises tag information and a preamble signal prior to the tag information, and
   wherein the estimating comprises:
     calculating a correlation value of an I channel signal in the preamble signal with the pilot signal by an I channel correlator of each of a plurality of channel estimators;
     calculating a correlation value of a Q channel signal in the preamble signal with the pilot signal by a Q channel correlator of each of the plurality of channel estimators;
     calculating correlation energy values based on the correlation value of the I channel signal and the correlation value of the Q channel signal by an energy calculator of each of the plurality of channel estimators; and
     calculating a channel coefficient of the I channel signal and a channel coefficient of the Q channel signal by using a maximum value among the correlation energy values.

\* \* \* \* \*